Figure 1:
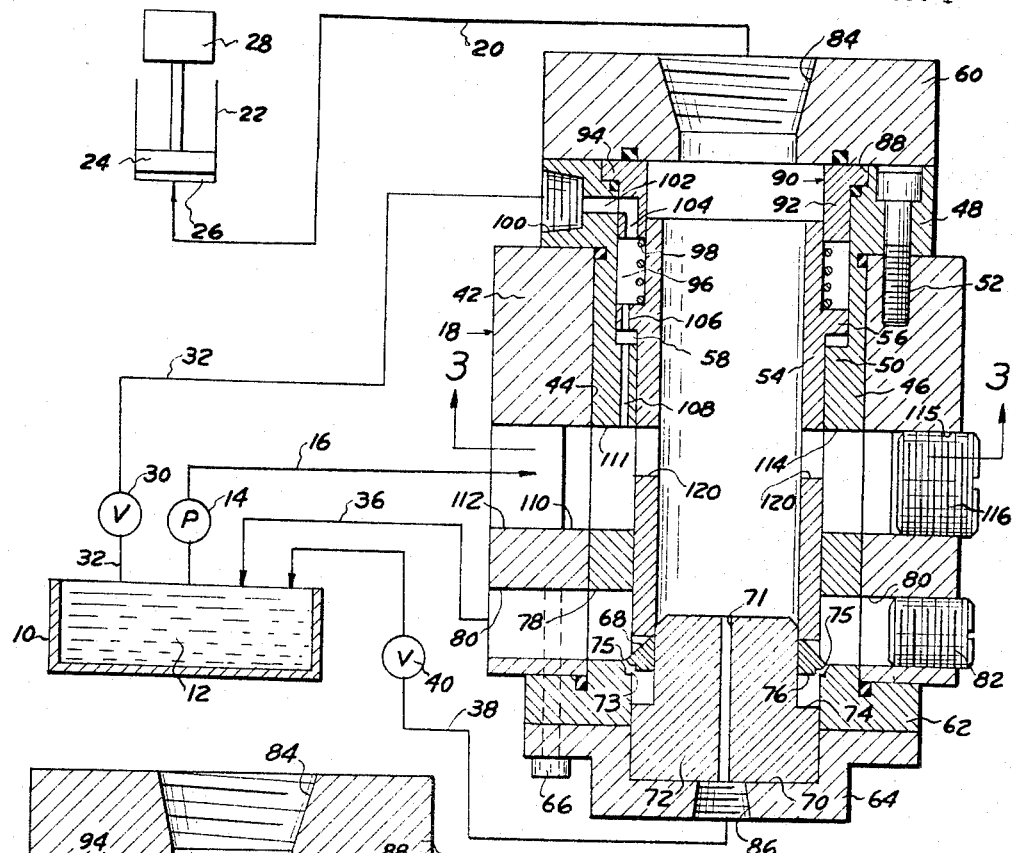

INVENTOR.
NILS O. ROSAEN

BY Hauke & Hauke

ATTORNEYS

INVENTOR.

NILS O. ROSAEN.

BY Hauke & Hauke

ATTORNEYS

United States Patent Office 3,283,779
Patented Nov. 8, 1966

3,283,779
CARTRIDGE VALVES
Nils O. Rosaen, Bloomfield Hills, Mich.
(1776 E. Nine Mile Road, Hazel Park, Mich.)
Filed Aug. 19, 1964, Ser. No. 390,510
14 Claims. (Cl. 137—596.14)

The present application is a continuation-in-part of application Ser. No. 371,884, filed May 28, 1964, now Patent No. 3,227,179, issued January 4, 1966 and which was a continuation-in-part of application Serial No. 163,-618 filed Jan. 2, 1962 and now abandoned.

The present invention relates to fluid systems, particularly to such a system employing one or more of the valves to be controlled by remotely positioned pilot valves, and more particularly to such a system having one or more improved cartridge type line valves utilizing inherent system pressures for selective operation of the valve and including automatically operable pressure relief means.

My aforementioned copending application discloses an improved cartridge type fluid valve intended to be controlled by a pilot valve for alternately supplying fluid under pressure to a fluid user and then exhausting the fluid from the user. The cartridge valve of the aforementioned application utilizes inherent fluid system pressures for selective operation of the valve and incorporates a pressure relief means so that the pressure of the fluid delivered to the fluid user can not exceed a desired value.

While the cartridge valve of my aforementioned copending application has proven to be highly satisfactory for many fluid systems installations, it has been found that in some fluid systems it is desirable to delay exhausting the fluid user for a period of time after the valve has been operated to close fluid flow from the pump to the fluid user. In the cartridge valve of my aforementioned patent application operation of the valve member to close fluid flow from the pump to the fluid user immediately opens a reverse flow path from the fluid user to the reservoir. The present invention provides an important improvement over my aforementioned disclosure by providing a separate selectively operable valve means to maintain fluid pressure to the fluid user for any desired time period after flow from the pump to the fluid user has been closed. Further, the cartridge valve of the present invention is constructed to permit several valves or more to be connected in series to control the operation of any number of fluid users through a single pumping means.

It is an object then of the present invention to improve fluid systems by providing a new cartridge type line valve utilizing inherent system pressures to selectively regulate fluid flow to and exhaust from a fluid user and including means for selectively delaying the exhaust of the fluid user.

It is still another object of the present invention to improve fluid systems by providing a combination reverse flow and pressure relief line valve incorporating means selectively operable to delay reverse flow through the valve.

It is still another object of the present invention to improve fluid systems by providing a new cartridge type line valve constructed to permit any number of such valves to be connected in series to control a plurality of fluid users through a single pumping means.

Figure 2:
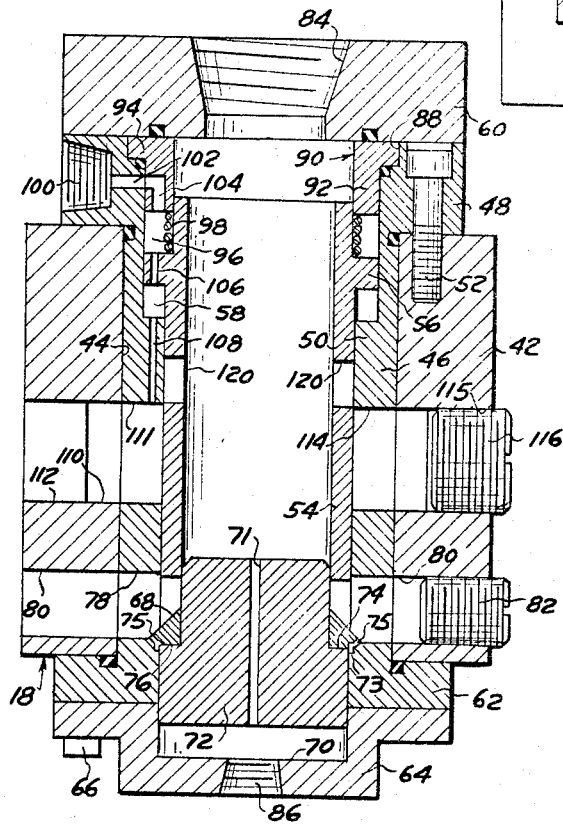
Figure 4:
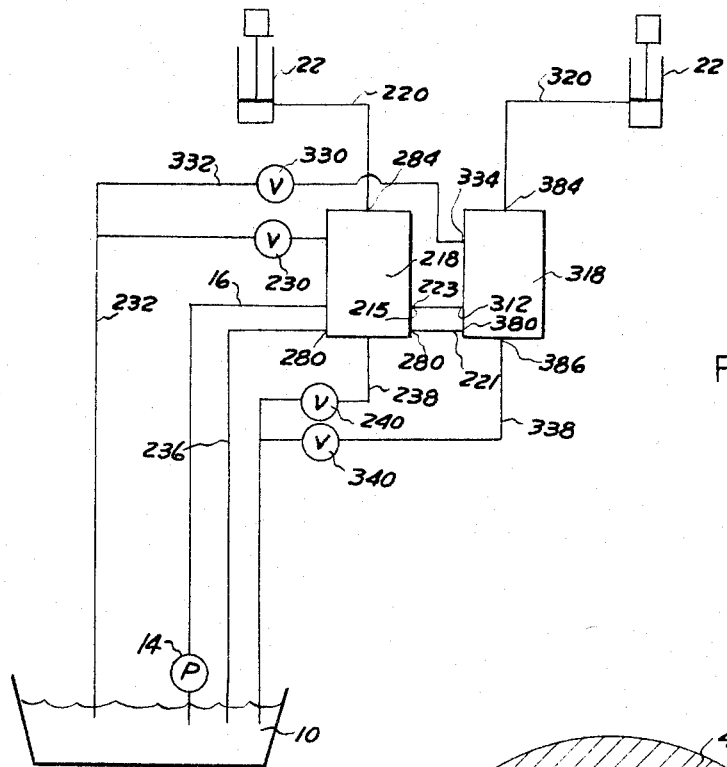
Figure 3:
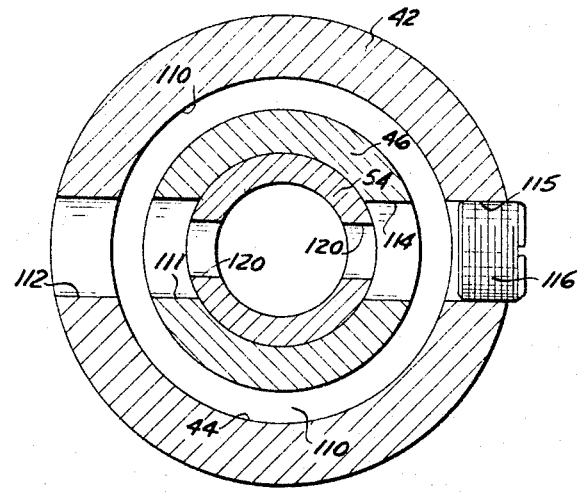

Still further objects and advantages of the present invention will readily occur to one skilled in the art to which the invention pertains upon reference to the following description and drawings in which like characters refer to like parts throughout the several views and in which:

FIG. 1 is a diagrammatic view of one preferred fluid system of the present invention including a longitudinal cross-sectional view of a preferred valve structure, FIG. 2 is a longitudinal cross sectional view of the preferred valve structure illustrated in FIG. 1 but showing the valve structure in a different operating position, FIG. 3 is a transverse cross-sectional view of the preferred valve structure taken substantially at line 2—2 of FIG. 1, and FIG. 4 is a diagrammatic view of another preferred fluid system of the present invention.

Description

Now referring to the drawings for a more detailed description of the present invention, FIG. 1 illustrates diagrammatically one preferred fluid system as comprising a reservoir 10 of any suitable type to store a fluid 12. A pump 14 is normally operable to deliver fluid through a conduit 16, through a valve structure indicated generally at 18 and through a conduit 20 to a fluid user 22. The fluid user 22 is illustrated as comprising a fluid actuated piston 24 operable upon fluid being delivered to a chamber 26 beneath the piston 24 to move a weight 28 upwardly. It is to be understood that the fluid user 22 is illustrated diagrammatically and can be any type of fluid user where it is desirable to selectively supply pressure to the user and exhaust pressure from the user and as will be described in greater detail below where it may be desirable to maintain pressure to the user for a length of time after fluid flow to the user has been cut off.

A pilot valve denoted diagrammatically at 30 may be of any type known in the art, and is operable to variably open and close fluid flow through a relief conduit 32 connecting the valve structure 18 and the reservoir 10. The valve structure 18 is also connected by conduit 36 to the reservoir 10. A second relief conduit 38 connects the valve structure 18 to the reservoir 10 through a second pilot valve 40.

As illustrated in FIGS. 1, 2 and 3, the valve structure 18 preferably comprises a housing 42 provided with a longitudinal bore 44. A sleeve member 46 is disposed in the bore 44 and is provided with a radially outwardly extending flange portion 48 adjacent one end thereof and a radially inwardly extending flange portion 50 axially inwardly spaced from the flange portion 48. The sleeve member 46 may be secured to the housing 42 by any convenient means such as bolts or screws 52 extending through the flange portion 48. A hollow piston 54 is axially slidably carried in the sleeve member 46 and is provided with a radially outwardly extending annular flange 56 disposed adjacent and slightly above the flange portion 50 of the sleeve member 46 to define a narrow and annular chamber 58 between the flange 56 and the flange portion 50.

A cap member 60 is secured to the flange portion 48 of the sleeve member 46 by any convenient means such as screws or bolts (not shown) to close the upper end of the housing 42. An end plate 62 and a cover 64 are secured to the opposite end of the housing 42 by any means such as screws or bolts 66. The end plate 62 is provided with a hollow frusto-conical boss portion 68 extending axially into the bore 44. The cover 64 is provided with an enclosed chamber 70 which with the hollow portion of the boss 68 provides a guide for an axially slidable piston 72. An annular flange 74 is provided on the piston 72 and in combination with a flange portion 76 provided on the boss portion 68 limits inward axial movement of the piston 72. The piston 72 is provided with an axial through passage 71. An annular chamber 73 is provided in the flange portion 76. In the position illustrated in FIG. 1 the lower edge of the hollow piston 54 seats against the boss portion 68 to close communication between the interior of the piston 54 and an annular recess 78 formed at the lower edge of the sleeve member 46. Drain ports 75 connect the chamber 73 to the annular chamber 78.

Ports 80 are provided in the housing 42 in communication with the recess 78. In the embodiment illustrated in FIGS. 1–3 one of the ports 80 is closed by a plug 82 and the other of the ports 80 is connected by the conduit 36 to the reservoir 10. The cap member 60 is provided with a port 84 in communication with the interior of the piston 54 and connected to the fluid user 22 by the conduit 20. A port 86 is provided in the cover 64 and is connected to the relief conduit 38 to provide communication between the chamber 70 and the reservoir 10.

An annular groove 88 is provided at the capped end of the sleeve member 46. A ring structure 90 comprises an axially extending base portion 92 and a radially outwardly extending flange portion 94. The flange portion 94 is carried in the groove 88 and the ring structure 90 and the flange 56 of the piston 54 are suitably spaced to provide an annular cavity 96 between the free end of the base portion 92 and the upper surface of the flange 56. The free end of the base portion 92 forms the seat for a spring 98 engaging the upper surface of the flange 56 to bias the piston 54 downwardly in the sleeve member 46 against the boss portion 68 of the end plate 62.

The flanged portion 48 of the sleeve member 46 is provided with a control outlet 100 connected to the reservoir 10 through the relief conduit 32 and the pilot valve 30. Passages 102 and 104 are provided in the sleeve member 46 and the ring structure 90 respectively to provide communication between the control outlet 100 and the cavity 96. A restricted orifice 106 is provided through the flange 56 to connect the annular cavity 96 with the chamber 58. A passage 108 extends through the flange portion 50 of the sleeve member 46 to provide communication between the chamber 58 and through a port 111 provided in the sleeve member 46 to an annular chamber 110. The chamber 110 is connected to the reservoir 10 through the conduit 16 and the pump 14. A port 114 is provided in an annularly spaced position from the port 111 and also registers with the chamber 110. A port 115 is provided in the housing 42 in registry with the chamber 110 and annularly spaced from the inlet 112.

In the embodiment illustrated in FIG. 1, the port 115 is closed by a plug 116. The piston 54 is provided with annularly spaced through ports 120 which provide communication between the interior of the piston 54 and the ports 111 and 114 when the piston 54 is in the axial position illustrated in FIG. 1.

When it is desired to supply pressurized fluid through the conduit 20 to the fluid user 22 the pilot valve 30 is regulated to a completely closed position while the pilot valve 40 is opened. The pressurized fluid will be delivered by the pump 14 through the conduit 16 to the chamber 110 of the valve 18. The passage 108 transmits the pressure produced by the pump 14 from the chamber 110 to the chamber 58 beneath the flange 56. With the pilot valve 30 closed and assuming a substantially constant pump pressure, the pressure on each side of the flange 56 will be substantially equal because of the communication across the flange afforded by the orifice 106. The spring 98 then will urge the piston 54 axially toward the position illustrated in FIG. 1. In this axial position of the piston 54, the ports 120 register with the ports 111 and 114 and thus the chamber 110 to provide communication between the inlet 112 and the interior of the piston member 54. The lower edge of the piston 54 engages the boss portion 68 to close communication between the interior of the piston 54 and the port 80. Thus a pressurized fluid will be delivered by the pump 14 through the interior of the piston 54 through the port 84 and to the fluid user 22 by conduit 20. With the pilot valve 40 open, the pressure present in the interior of the piston member 54 will cause the piston 72 to move downwardly in the chamber 70 to the position illustrated in FIG. 1.

When it is desired to exhaust the fluid user 22 through the valve structure 18, the pilot valve 30 is regulated from the closed position to an open position to open the relief conduit 32 and the control outlet 100 to the lower pressure of the reservoir 10. The pressure is thus relieved from cavity 96 to produce a pressure differential across the flange 56 which will move the piston 54 axially against the force of the spring 98 and toward the position illustrated in FIG. 2. The orifice 106 is of a smaller cross-sectional area than the passages 102 and 108, so that the amount of fluid relieved by the pilot 30 will not be as great as the volume of fluid delivered through the passage 108 to the cavity 58. This maintains a pressure differential across the flange 56 any time the pilot valve 30 is opened which is sufficiently high to retain the piston member 54 in an upward axial position.

With the piston 54 in its upward axial position the ports 120 no longer register with the chamber 110 so that fluid flow is closed from the pump 14 to the interior of the piston 54. As the piston 54 is moving towards its upper axial position, the lower edge of the piston 54 moves away from the boss portion 68 toward the position illustrated in FIG. 2.

If the pilot valve 40 is left in an open position while the pilot valve 30 is being opened, then as the piston member 54 moves away from the boss portion 68 the port 80 is opened to the interior of the piston member 54. This will produce an immediate reverse flow fluid path between the port 84 and the port 80 to exhaust the fluid user 22. When it is desired to maintain a pressure at the fluid user 22 even after the piston 54 has moved to a position closing flow from the pump 14 to the user 22, the pilot valve 40 is moved to a closed position. The pressure of the interior of the piston member 54 is then transmitted by the passage 71 through the piston 72 to the chamber 70. Because of the flanged construction of the piston 72 the chamber 73 is open at all times to the port 80 by the drain ports 75 and is thus subjected to atmospheric pressure. The pressure in the chamber 70 will be acting upon a greater surface of the piston 72 so that closing the pilot valve 40 will cause the piston 72 to move upwardly into the piston member 54 to close communication between the interior of the piston 54 and the port 80 as illustrated in FIG. 2. Thus with the piston 72 in its upward position, pressure to the fluid user 22 will be maintained. When it is desired to relieve this pressure, the pilot valve 40 will be opened to relieve the pressure in the chamber 70 permitting the piston 72 to move axially downwardly toward the position shown in FIG. 1 to open the port 80 and thus produce a reverse flow through the valve 18 from the port 84 to the port 80.

By regulating the pilot valve 30 between a fully opened position and a fully closed one, the pressure differential across the flange 56 may be regulated so that the piston 54 can be selectively positioned within the sleeve member 46. In this manner the amount of fluid flowing to the fluid user 22 as well as its pressure may be regulated. It is apparent that the movement of the piston 54 corresponds directly to the degree of opening of the pilot valve 30. In effect then, the fluid flow as well as the pressure of the fluid delivered to the fluid user 22 will vary inversely with the fluid flow through the control outlet 100.

It is to be noted that the valve 18 of the present invention like the valve of my aforementioned patent, acts also as a pressure relief valve. If the pressure of the fluid delivered through the conduit 16 exceeds the predetermined value, the increased pressure will be transmitted through the passage 108 to the chamber 58 to cause the piston 54 to move upwardly against the spring 98 and to open the interior of the piston 54 to the reservoir 10 through the port 80. Although the pressure across the flange 56 will eventually equalize the difference in cross-sectional areas of the passage 108 and the orifice 106 will delay equalization for a period of time sufficient to relieve the excess pressures. It is to be further noted that the valve 18 of the present invention is of an open centered construction. This means that as the piston 54 is moving intermediate a position in which chamber 110 is opened to the interior of the piston 54 and a position in which chamber 110 is closed to the interior of the piston 54, the relief port 80 remains open to the interior of the piston 54 so that excessive pressures cannot be built up in the system during the opeartion of the valve 18.

FIG. 4 illustrates diagrammatically another preferred fluid system of the present invention. This system is intended to operate a plurality of fluid users 22 by using a valve 18 for each of the fluid users 22 and requiring a single pump 14 for operation of the users 22.

In such a system two or more valves like those described above would be used. These valves have been indicated by reference characters 218 and 318 but it is to be understood that each of the valves is like the valve 18 described above and the reference characters have been changed only to avoid confusion during the description of the operation of this system.

The valve 218 is connected to one of the fluid users 22 through the port 284 and conduit 220 and to the reservoir 10 through the pump 14 and conduit 16 as well as by the relief conduit 232 and pilot valve 230, the conduit 236 and port 280 and relief conduit 238 and pilot valve 240, substantially as described above with reference to the fluid system disclosed in FIG. 1. The only difference between the valve 218 and the valve 18 described above is that the plugs 82 and 116 have been removed so that the ports 80 and 115 can be connected to the valve 318. The port 280 of the valve 218 is connected by conduit 221 to the port 380 of valve 318. The port 215 of the valve 218 is connected by conduit 223 to the inlet 312 of the valve 318. The port 384 of valve 318 is connected by conduit 320 to the other fluid user 22. The relief port 334 of valve 318 is connected through relief conduit 332 and pilot valve 330 to the reservoir 10. The port 386 of valve 318 is connected through relief conduit 338 and pilot 340 to the reservoir 10.

It is apparent from the description of the valve structure above with reference to FIGS. 1–3 that the inlet 312 of the valve structure 318 will be connected at all times with the pump 14 through the annular chamber 110 (not shown in FIG. 4) and the port 215 of the valve structure 218. Thus each of the valve structures 218 and 318 can be operated through the pilot valves 230, 240 and 330, 340 respectively to control pressure to the fluid users 22 exactly as described above.

Although I have described but several embodiments of my present invention it is apparent that many changes and modifications can be made therein without departing from the spirit of the invention as expressed by the scope of the appended claims.

I claim:
1. In a valve,
  (a) a housing provided with an inlet, an outlet, and a fluid port,
  (b) said housing being provided with an axially extending bore,
  (c) a piston axially slidably carried in said bore,
  (d) a spring carried in said housing urging said piston in one axial direction,
  (e) a control outlet provided in said housing and passages connecting said control outlet with said inlet,
  (f) said control outlet being adapted to for connection with a pilot valve operable to selectively vary the flow through said control outlet,
  (g) at least one of said passages being restricted whereby to create a pressure differential which varies depending upon the amount of flow allowed through said control outlet,
  (h) means to transmit such pressure differential to said piston and to urge axial movement of said piston in opposition to said spring upon an increase in said pressure differential,
  (i) said piston being provided with a first valve means opening communication between said inlet and said port at one operating position thereof and closing communication between said inlet and said port and opening communication between said port and said outlet at another operating position thereof, and
  (j) a second valve means carried in said housing and being selectively operable independently of said first valve means to close communication between said port and said outlet at either operating position of said piston,
  (k) said second valve means comprising a movable piston disposed within said bore at one end of said first mentioned piston, means for providing fluid pressure to one side of said second mentioned piston to urge same toward a position closing fluid flow from said port through said outlet and means for selectively exhausting said fluid pressure to move said last mentioned piston to a position closing fluid flow from said port through said outlet.

2. In a fluid valve,
  (a) a housing provided with a bore,
  (b) a piston slidable in said bore and control means selectively positioning said piston in said bore,
  (c) said housing having a pressure inlet adapted to be connected with a fluid pressure source, a port adapted for connection of a fluid user, and a pressure relief outlet,
  (d) said piston having a first valve means operable to close said pressure relief outlet and open fluid flow between said inlet and said port at one axial position thereof and to close fluid flow from said inlet to said port and to open said pressure relief outlet to said port in another axial position thereof,
  (e) said housing being provided with a second valve means operable independently of the position of said piston to close said pressure relief outlet,
  (f) control means comprising a control outlet in said housing communicating with said inlet and adapted to be connected to a pilot valve operable to selectively variably open and close fluid flow through said control outlet,
  (g) means responding to a change in the fluid flow through said control outlet to actuate said piston toward one of said operating positions,
  (h) said second valve means comprising a movable piston disposed in said bore at one end of said first mentioned piston, means for providing fluid pressure to one side of said last mentioned piston to urge same toward a position closing fluid flow from said port to said relief outlet, and means for selectively exhausting said fluid pressure to move said last mentioned piston toward a position opening fluid flow from said port and through said relief outlet.

3. A valve as defined in claim 2 and including means operable to open said relief outlet upon the pressure in said inlet exceeding a predetermined value.

4. The valve as defined in claim 2 and in which said first mentioned piston is provided with a substantially annular flange,
  (a) said fluid responsive means comprising a pair of fluid passages connected in series intermediate said inlet and said control outlet,
  (b) each of said passages having a different cross-sectional area whereby to produce a pressure differential intermediate said passages upon opening of said control outlet,
  (c) said flange being disposed intermediate said passages whereby upon opening of said control outlet said flange and said piston are urged axially in said bore towards one of said axial positions.

5. The valve as defined in claim 4 and including means acting upon said flange to urge said piston axially in opposition to the movement produced upon an increase in the pressure differential across said flange.

6. A fluid system comprising,
(a) a fluid reservoir, a plurality of fluid users, and conduit means connecting said fluid reservoir to each of said fluid users,
(b) a pump connected in said conduit means to deliver fluid under pressure to each of said fluid users,
(c) a first valve connected in said conduit means having an inlet connected to said pump and a port connected to one of said fluid users,
(d) said first valve being further provided with a control outlet connected with said reservoir and a pressure relief outlet connected with said reservoir,
(e) a valve member being disposed intermediate said reservoir and said control outlet and operable to selectively close and variably open fluid flow from said control outlet to said reservoir,
(f) said first valve being provided with a valve means operable to direct fluid flow from said inlet to said port to said fluid user in a first operating position of said valve means and to close fluid flow from said inlet to said port and to open a reverse fluid flow from said user to said port through said pressure relief outlet to said reservoir in another operating position of said valve means,
(g) said valve means including means responsive to changes in the fluid flow through said control outlet to urge said valve means towards one of said operating positions,
(h) a second valve connected in said conduit means and having an inlet connected through said first means to said pump and a port connected to another of said fluid users,
(i) said second valve being further provided with a control outlet connected with said reservoir and a pressure relief outlet connected with said reservoir,
(j) a second valve member being disposed intermediate said reservoir and said control outlet of said second valve and operable to selectively close and variably open fluid flow through said second mentioned control outlet to said reservoir,
(k) said second valve being provided with a valve means operable to direct fluid flow from said inlet through said port to said fluid user in a first operating position of said valve means and to close fluid flow from said inlet to said port to open a reverse fluid flow from said user through said port through said pressure relief outlet to said reservoir at another operating position of said valve means,
(l) said second mentioned valve means including means responsive to changes in the fluid flow through said control outlet to urge said valve means toward one of said operating positions, and
(m) each of said valves including a movable piston associated respectively with said valve means of said first and second valves, means for selectively providing fluid pressure independently to the side of either of said pistons to respectively move said pistons toward positions closing fluid flow from said ports through said pressure relief outlets, and means for selectively and independently exhausting said fluid pressure to move either or both of said pistons to positions opening fluid flow through said relief outlets.

7. The fluid system as defined in claim 6 and in which each of said valves includes means operable to open said relief outlet upon a predetermined pressure being exceeded at either of said inlets.

8. A fluid valve comprising,
(a) a housing having an inlet adapted for connection to a source of fluid under pressure, a port adapted for connection to a fluid user, and an outlet adapted for connection to a fluid reservoir,
(b) a hollow piston axially slidably carried in said housing, said port registering with the interior of said hollow piston, and said piston having a first valve means opening fluid flow from said inlet through the interior of said hollow piston and to said port and closing fluid flow through said outlet at a first operating position of said piston and closing fluid flow from said inlet to the interior of said piston and opening fluid flow from the interior of said piston to said outlet at a second operating position of said piston whereby at said first operating position of said piston fluid under pressure is directed through said inlet and through the interior of said hollow piston to said port and at said second operating position of said piston pressure is relieved from said fluid user through said port through said hollow piston and through said outlet, and
(c) a second valve means selectively independently operable from said first valve means to close fluid flow from the interior of said piston to said outlet,
(d) said second valve means comprising a movable piston carried in said housing at one end of said first mentioned piston, means for providing fluid pressure to one side of said second mentioned piston to urge same toward a position closing the end of said first mentioned piston whereby to close fluid flow from said port, through said first mentioned piston and through said outlet, and means for selectively exhausting said fluid pressure to move said second mentioned piston away from the end of said first mentioned piston whereby to open fluid flow from said port through said first mentioned piston and through said outlet.

9. A fluid valve comprising:
(a) a housing having an inlet adapted for connection to a source of fluid under pressure, a port, and an outlet,
(b) a piston axially slidably carried in said housing and having a first valve means opening fluid flow from said inlet to said port and closing fluid flow from said inlet to said outlet in a first operating position of said piston and closing fluid flow from said inlet to said port and opening fluid flow from said port to said outlet at a second operating position of said piston, and
(c) a second valve means operably associated with said piston and being operable to selectively delay opening fluid flow from said port to said outlet at said second operating position of said piston, and
(d) said second valve means comprising a second piston member carried in said housing intermediate said first mentioned piston and said outlet and means selectively operable to actuate said second piston member toward and away from a position closing communication between said port and said outlet.

10. A fluid valve comprising,
(a) a housing having an inlet adapted for connection to a source of fluid under pressure, a port and an outlet,
(b) a piston axially slidably carried in said housing and having means opening fluid flow from said inlet to said port and closing fluid flow from said inlet to said outlet in a first axial position of said piston and closing fluid flow from said inlet to said port at a second axial position of said piston,
(c) means resiliently urging said piston toward said first axial position,
(d) a control outlet provided in said housing and means providing communication at all times between said control outlet and said inlet,
(e) valve means selectively operable to close and to variably open fluid flow through said control outlet,
(f) means operable upon said valve means being variable opened to urge said piston toward said second axial position,
(g) a second valve means selectively operable upon said piston being moved to said second axial position to move intermediate positions opening and closing fluid flow from said port through said outlet, (h) said second valve means comprising a movable piston disposed within said housing at one end of said first mentioned piston, means for providing fluid pressure to one side of said last mentioned piston to urge same toward a position closing fluid flow from said port through said outlet and means for selectively exhausting said fluid pressure whereby said last mentioned piston will be moved to a position opening fluid flow from said port through said outlet.

11. The fluid valve as defined in claim 10 and in which the effective area on said mentioned side of said last mentioned piston is greater than the effective area on the opposite side of said last mentioned piston and said fluid pressure supplying means comprises means providing communication from said port to both sides of said last mentioned piston.

12. A fluid valve comprising,
 (a) a housing having an inlet adapted for connection to a source of fluid under pressure, a port adapted for connection to a fluid user, and an outlet adapted for connection to a fluid reservoir,
 (b) a hollow piston axially slidably carried in said housing, said port registering with the interior of said hollow piston, and said piston having a first valve means opening fluid flow from said inlet through the interior of said hollow piston and to said port and closing fluid flow through said outlet at a first operating position of said piston and closing fluid flow from said inlet to the interior of said piston and opening fluid flow from the interior of said piston to said outlet at a second operating position of said piston whereby at said first operating position of said piston fluid under pressure is directed through said inlet and through the interior of said hollow piston to said port and at said second operating position of said piston pressure is relieved from said fluid user through said port through said hollow piston and through said outlet,
 (c) a control outlet provided in said housing and means providing communication at all times between said control outlet and said inlet,
 (d) means selectively varying fluid flow through said control outlet,
 (e) said piston having a flanged portion disposed intermediate said inlet and said control outlet and said communication providing means comprising a first passage provided in said housing and a second passage provided in said flange portion, said passages having different cross-sectional areas and being connected in series whereby upon varying fluid flow through said control outlet a pressure differential is produced to cause said flange portion to urge said piston toward one of said operating positions,
 (f) means urging said piston toward the other of said operating positions, and selectively independently operable from said first valve means to close fluid flow from the interior of said piston to said outlet,
 (g) said second valve means comprising a movable piston disposed within said housing at one end of said first mentioned piston intermediate the interior of said first mentioned piston and said outlet, means for providing fluid pressure to one side of said last mentioned piston to urge same toward a position closing fluid flow from said port and the interior of said hollow piston through said outlet and means for selectively exhausting said fluid pressure to produce movement of said last mentioned piston opening fluid flow from said port through said hollow piston and through said outlet.

13. The fluid valve as defined in claim 12 and in which the effective area on said first mentioned side of said last mentioned piston is greater than the effective area on the opposite side of said last mentioned piston and said fluid pressure supplying means comprises means providing communication from said port to both sides of said last mentioned piston.

14. A fluid valve comprising,
 (a) a housing having an inlet adapted for connection to a source of fluid under pressure, a port, and an outlet,
 (b) a piston axially slidably carried in said housing and having a first valve means opening fluid flow from said inlet to said port and closing fluid flow from said inlet to said outlet in a first operating position of said piston and closing fluid from said port to said outlet at a second operating position of said piston and closing fluid flow from said inlet to said port and opening fluid flow from said port to said outlet at a second operating position of said piston,
 (c) a control outlet provided in said housing and means providing communication at all times between said control outlet and said inlet,
 (d) a valve selectively operable to close and to variably open fluid flow through said control outlet,
 (e) means operable upon said valve being variably opened to actuate said piston towards one of said operating positions,
 (f) means resiliently urging said piston toward the other of said operating positions, and
 (g) a second valve means selectively operable upon said piston being moved to said second operating position to move intermediate position opening and closing fluid flow from said port through said outlet,
 (h) said second valve means comprising a movable piston disposed within said housing at one end of said first mentioned piston, means for providing fluid pressure to one side of said last mentioned piston to urge same toward a position closing fluid flow from said port through said outlet and means for selectively exhausting said fluid pressure to move said last mentioned piston to a position opening fluid flow from said port through said outlet.

References Cited by the Applicant

UNITED STATES PATENTS

| | | |
|---|---|---|
| 1,092,984 | 4/1914 | Ewalt. |
| 1,958,010 | 5/1934 | Meurk. |
| 2,251,618 | 8/1941 | Rogers et al. |
| 2,401,144 | 5/1946 | Dube. |
| 2,729,242 | 1/1956 | Olson. |
| 2,854,995 | 10/1958 | Lormitzo. |
| 3,074,433 | 1/1963 | Stark. |
| 3,227,179 | 1/1966 | Rosaen. |

M. CARY NELSON, *Primary Examiner.*

H. KLINKSIEK, *Examiner.*